(12) United States Patent
Hopper

(10) Patent No.: US 7,363,982 B2
(45) Date of Patent: Apr. 29, 2008

(54) SUBSEA WELL PRODUCTION FLOW SYSTEM

(75) Inventor: Hans Paul Hopper, Aberdeen (GB)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 10/940,380

(22) Filed: Sep. 14, 2004

(65) Prior Publication Data

US 2005/0061515 A1 Mar. 24, 2005

(30) Foreign Application Priority Data

Sep. 24, 2003 (EP) .................................. 03256021

(51) Int. Cl.
*E21B 29/12* (2006.01)

(52) U.S. Cl. ...................... 166/357; 166/367

(58) Field of Classification Search ................ 166/357, 166/367
See application file for complete search history.

(56) References Cited

U.S. PATENT DOCUMENTS

| | | | |
|---|---|---|---|
| 2,468,070 A | 4/1949 | Hunter | |
| 3,346,117 A | 10/1967 | Page, Jr. | |
| 3,543,846 A * | 12/1970 | Brun et al. | .................. 166/356 |
| 3,545,215 A | 12/1970 | Burrus | |
| 4,175,039 A | 11/1979 | Fisher | |
| 4,438,817 A * | 3/1984 | Pokladnik et al. | ........... 166/341 |
| 4,527,632 A * | 7/1985 | Chaudot | ...................... 166/357 |
| 4,900,433 A | 2/1990 | Dean et al. | |
| 4,955,436 A | 9/1990 | Johnston | |
| 5,004,051 A | 4/1991 | Rosendahl et al. | |
| 5,004,442 A | 4/1991 | Lemelson et al. | |
| 5,004,552 A | 4/1991 | Al-Yazdi | |
| 5,154,741 A * | 10/1992 | da Costa Filho | .............. 96/157 |
| 5,248,421 A | 9/1993 | Robertson | |
| 5,431,228 A * | 7/1995 | Weingarten et al. | ........ 166/357 |
| 6,062,313 A | 5/2000 | Moore | |
| 6,068,053 A * | 5/2000 | Shaw | .......................... 166/267 |
| 6,129,152 A | 10/2000 | Hosie et al. | |
| 6,197,095 B1 * | 3/2001 | Ditria et al. | ................... 95/248 |
| 6,216,799 B1 | 4/2001 | Gonzalez | |

(Continued)

FOREIGN PATENT DOCUMENTS

GB 499024 1/1939

(Continued)

OTHER PUBLICATIONS

UK Search Report for Appl. No. PCT/GB03/01253 dated Jul. 16, 2003; (pp. 3).

(Continued)

*Primary Examiner*—Thomas A Beach
(74) *Attorney, Agent, or Firm*—Conley Rose, P.C.

(57) ABSTRACT

Methods and apparatus for flowing a subsea well. The method comprises the steps of: supplying a multi-phase medium from a subsea tree 18 to a removable separator package 10; separating the multi-phase flow into one or more phases at the desired pressures, the pressures being controlled by one or more pressure control devices 51, 67, 71, 75, 76, 77, 78, 79 on one or more outlets from the separator package 10; and analysing each of the one or more phases to determine the amount and quality of products produced by the well.

17 Claims, 6 Drawing Sheets

U.S. PATENT DOCUMENTS

| | | |
|---|---|---|
| 6,269,880 B1 | 8/2001 | Landry |
| 6,276,455 B1 * | 8/2001 | Gonzalez ............... 166/357 |
| 6,325,159 B1 | 12/2001 | Peterman et al. |
| 6,328,118 B1 | 12/2001 | Karigan et al. |
| 6,527,054 B1 | 3/2003 | Fincher et al. |
| 6,569,323 B1 | 5/2003 | Pribytkov |
| 6,578,637 B1 | 6/2003 | Maus et al. |
| 6,640,901 B1 * | 11/2003 | Appleford et al. ....... 166/357 |
| 6,651,745 B1 * | 11/2003 | Lush et al. ............ 166/357 |
| 6,773,605 B2 * | 8/2004 | Nyborg et al. ........... 210/741 |
| 6,989,103 B2 * | 1/2006 | Mohsen et al. ........... 210/708 |
| 7,013,978 B2 * | 3/2006 | Appleford et al. ....... 166/357 |
| 7,134,498 B2 * | 11/2006 | Hopper .................. 166/357 |
| 7,152,682 B2 * | 12/2006 | Hopper .................. 166/357 |
| 2002/0007968 A1 | 1/2002 | Gardes |
| 2003/0062198 A1 | 4/2003 | Gardes |
| 2003/0168391 A1 | 9/2003 | Tveiten |
| 2004/0031622 A1 | 2/2004 | Butler et al. |
| 2004/0099422 A1 * | 5/2004 | Lush et al. ............ 166/357 |
| 2004/0244983 A1 * | 12/2004 | Appleford et al. ....... 166/357 |
| 2004/0251030 A1 * | 12/2004 | Appleford et al. ....... 166/357 |

FOREIGN PATENT DOCUMENTS

| | | |
|---|---|---|
| GB | 2 255 102 | 10/1992 |
| WO | WO 92/14030 | 8/1992 |
| WO | WO 01/20128 | 3/2001 |
| WO | WO01/20128 * | 3/2001 |
| WO | WO 02/088519 | 11/2002 |
| WO | WO03/023181 | 3/2003 |
| WO | WO 03/033868 | 4/2003 |
| WO | WO 03/033871 | 4/2003 |
| WO | WO03/078793 | 9/2003 |

OTHER PUBLICATIONS

Office Action dated Aug. 8, 2005 for U.S. Appl. No. 10/940,140 (pp. 14).

Final Office Action dated Dec. 29, 2005 for U.S. Appl. No. 10/940,140 (pp. 11).

Office Action dated Jun. 4, 2007 for U.S. Appl. No. 10/510,554 (pp. 8).

EP Examination Report dated Jun. 21, 2006 for Appln. No. 03 256 021.1 (pp. 4).

* cited by examiner

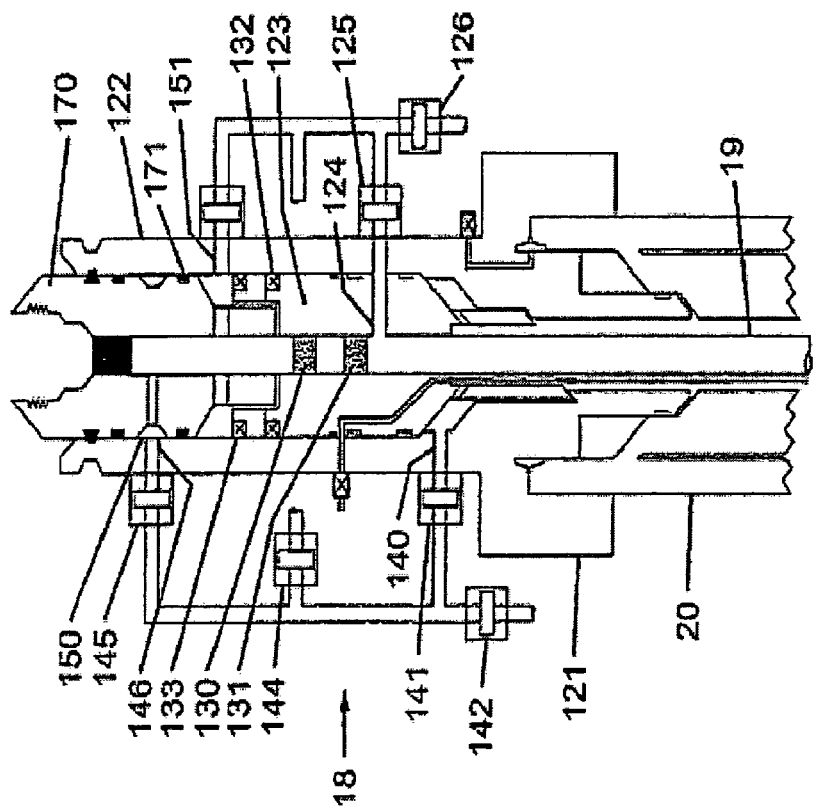

SUBSEA WELL PRODUCTION FLOW SYSTEM

CROSS-REFERENCE TO RELATED APPLICATIONS

This application claims priority to European Patent Application No. 0.3256021.1, which was filed Sep. 24, 2003, and is titled "Subsea Well Production Flow System", and is related to U.S. application Ser. No. 10/940,140 filed Sep. 14, 2004, now U.S. Pat. No. 7,134,498, and U.S. application Ser. No. 10/510,554 filed Oct. 7, 2004.

STATEMENT REGARDING FEDERALLY SPONSORED RESEARCH OR DEVELOPMENT

Not Applicable.

BACKGROUND

This invention relates to a subsea well production flow system and to a method of production testing and recording downhole characteristics in a subsea well. In particular, the invention relates to a method and system which assist in the determination of the quality and amount of products, such as gaseous or liquid hydrocarbons, produced by the well while at the same time logging the well to identify the rate of flow over the producing formation sections.

When a new production well is drilled and completed, it is necessary to flow test the well to evaluate its performance and flow characteristics from different intervals of the well. In an existing field, the well can be connected to the field seabed infrastructure and flowed back individually along the field's dedicated test line to the surface production installation on the surface installation, the well fluids can be separated and analysed for, amongst other things, flow rate, density and composition while at the same time carrying out a well intervention to monitor the downhole characteristics using a separate intervention vessel.

There are numerous disadvantages to this approach. Firstly, the subsea field infrastructure requires an individual and separate test line. Secondly, the new production well must be close to a field connection point and subsequently has to be connected to that connection point. Thirdly, the well must have sufficient energy to supply the fluid to the surface for the analysis to be carried out. Fourthly, a separate operation is required to access the well.

Other situations in which it is advantageous to flow test a well are on exploration wells, appraisal wells or early development wells to evaluate the production capabilities prior to installation of the flow lines or for production wells where there are no means to flow the well individually. All of these may be situations in which there is no field into which the fluid can be supplied. Currently, in order to flow test any of the above wells, it is necessary to provide either a drilling vessel or a work over vessel, together with a riser system in which the fluids from the well can be delivered to the surface, where they can be processed by a portable test separator on the deck of the respective vessels.

The disadvantages of the known arrangements are that the well must have sufficient energy to flow to the surface and, as a significant number of wells will not flow naturally to the surface, these cannot be tested.

Typically, the duration of a flow test depends upon the required degree of investigation, but last for at least two to three days, but could be for as long as several months. Quite clearly, the longer the flow test is carried out for, the better the fields reservoir performance can be estimated, but this can, of course, be extremely costly.

For a long test, a surface vessel is required which is expensive, time consuming and entirely dependent on having suitable weather conditions on the surface for the duration of the test. The key factor is to monitor the draw down of the reservoir by continuously flowing the well, and preferably to use continuous monitoring equipment suspended in the well or by carrying our periodic well production logging operations.

SUMMARY OF THE PREFERRED EMBODIMENTS

According to the present invention, there is provided a method of production flowing a subsea well, the method comprising the steps of: supplying a multi-phase medium from a subsea tree to a removable separator package; separating the multi-phase flow into one or more phases at the desired pressures, the pressures being controlled by one or more pressure control devices on one or more outlets from the separator package; and analysing each of the one or more phases to determine the amount and quality of products produced by the well.

In this way, the present invention allows the individual phases within the fluids produced by a well to be continuously tested and analysed either subsea or at the surface when a vessel is on the well.

When there is sufficient field infrastructure in place to connect the well production test system to, it will allow the well bore surface intervention vessel to depart and possibly return at periodic periods over the production test duration if monitoring equipment is not installed in the well. Alternatively, it could remain in place as an early production system.

For subsea this avoids the need for a continuous surface intervention installation which, as described above, are costly, complex and not always suitable for all fields.

Preferably, the multi-phase flow is separated by passing the flow into a toroidal separator. Such a toroidal separator provides a suitable separator which can be mounted in a subsea separator package, such that the fluids can piped individually to the surface, or can be commingled into either a rigid riser, flexible riser, or one or more flow lines. If the well does not have sufficient drive on its own to the seabed, artificial lift, such as gas lift, can assist the well to deliver the multi phase fluid to the production flow test system.

By providing pressure control devices on the outlets from the separator package, the separator can be operated at below ambient seawater pressure, or below the well fluid's hydrostatic pressure at the seabed, but will therefore require one or more pumps to carry the individual phases to the surface. This will allow a greater range of separation and a more detailed analysis of the performance of the well. Additionally, being able to lower the pressure considerably below the seawater ambient pressure, or below the well fluid's hydrostatic pressure at the seabed, will quickly allow the well to be brought on for a well that has insufficient energy. For low pressure wells this could be a process which can sometimes take several days, especially if the well has previously been killed by bullheading prior to a workover.

The present invention also provides a system for use in flow testing a subsea well, the system comprising: a subsea tree for, in use, connection to a wellhead; a separator package in fluid communication with a fluid take off from the subsea tree, such that, in use, a multi-phase medium can flow from the subsea tree into the separator for separation into one or more phases; and a pressure control device on each of one or more outlets from the separator package for allowing the system to be operated at different wellhead pressures.

The separator package may be located adjacent the subsea tree or, alternatively, may be mounted above the tree, to allow vertical access through the separator package and into the subsea tree.

BRIEF DESCRIPTION OF THE DRAWINGS

Examples of the present invention will now be described with reference to the accompanying drawings, in which:

FIGS. 6A and 6B show external and internal caps for a spool tree for use in the present invention.

DETAILED DESCRIPTION OF THE PREFERRED EMBODIMENTS

Figure 1:
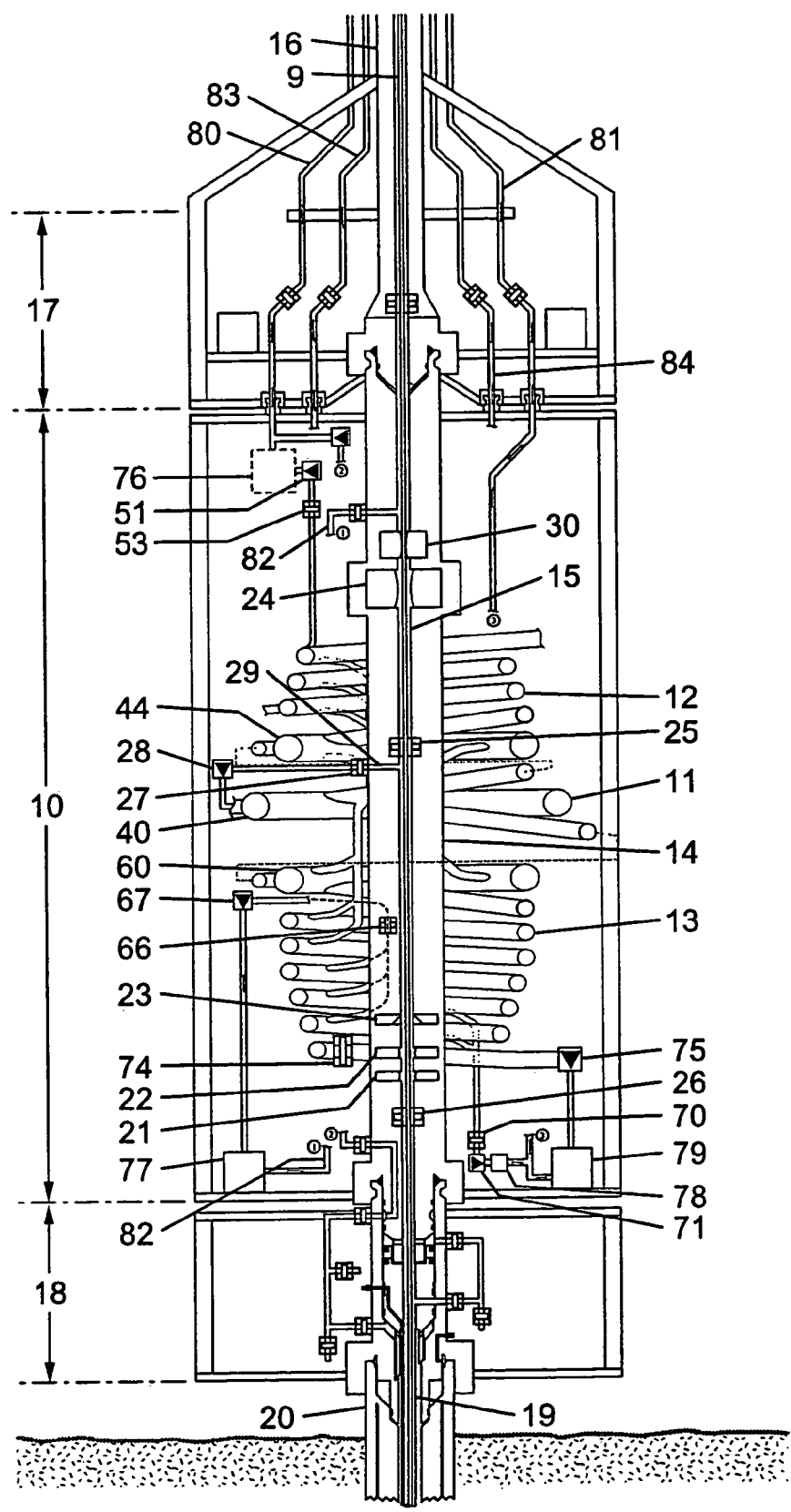
FIG. 1 shows a schematic side view of a stacked configuration of the present invention with an intervention riser.

FIG. 1 shows the present invention in a stacked configuration with vertical bore access to a surface vessel using an intervention riser. An advantage of using an intervention riser is that it can operate above the maximum well operations pressure. A separator package 10, including a toroidal separator 11, and associated spiral conduits 12, 13, are mounted around a spool body 14, having a bore extending from the surface (not shown), through an intervention riser 16, and an emergency disconnect package 17, spool body 14, the separator package, and into a spool tree 18 and, ultimately, into a subsea well. The well is provided, at its upper end, with a wellhead assembly 20 and is connected to the spool tree 18.

The spool body 14 is provided with numerous rams including coil tubing gripping rams 21, lower rams 22 and upper shear/blind rams 23. The lower rams 22 may be coil tubing, cable or wire line rams. The shear/blind rams are designed such that, when operated, they can cut through the coil tubing 9 logging cable or wire line within the riser and provide a single pressure mechanical isolating barrier between the pressurised production fluid and the surface. An annular 24 and a stripping annular 30 are provided above the rams and upper 25 and lower 26 production barrier valves are located respectively above and below the rams.

This configuration allows the surface intervention vessel to run downhole monitoring equipment and to log the well, yet in an emergency can seal, cut, shut down the vertical flow and disconnect the intervention riser.

A production fluid take-off 29 from the bore 15 passes through a multi-phase valve 27 and a multi-phase choke 28 into the main bore 40 of the separator 11.

Figure 2:
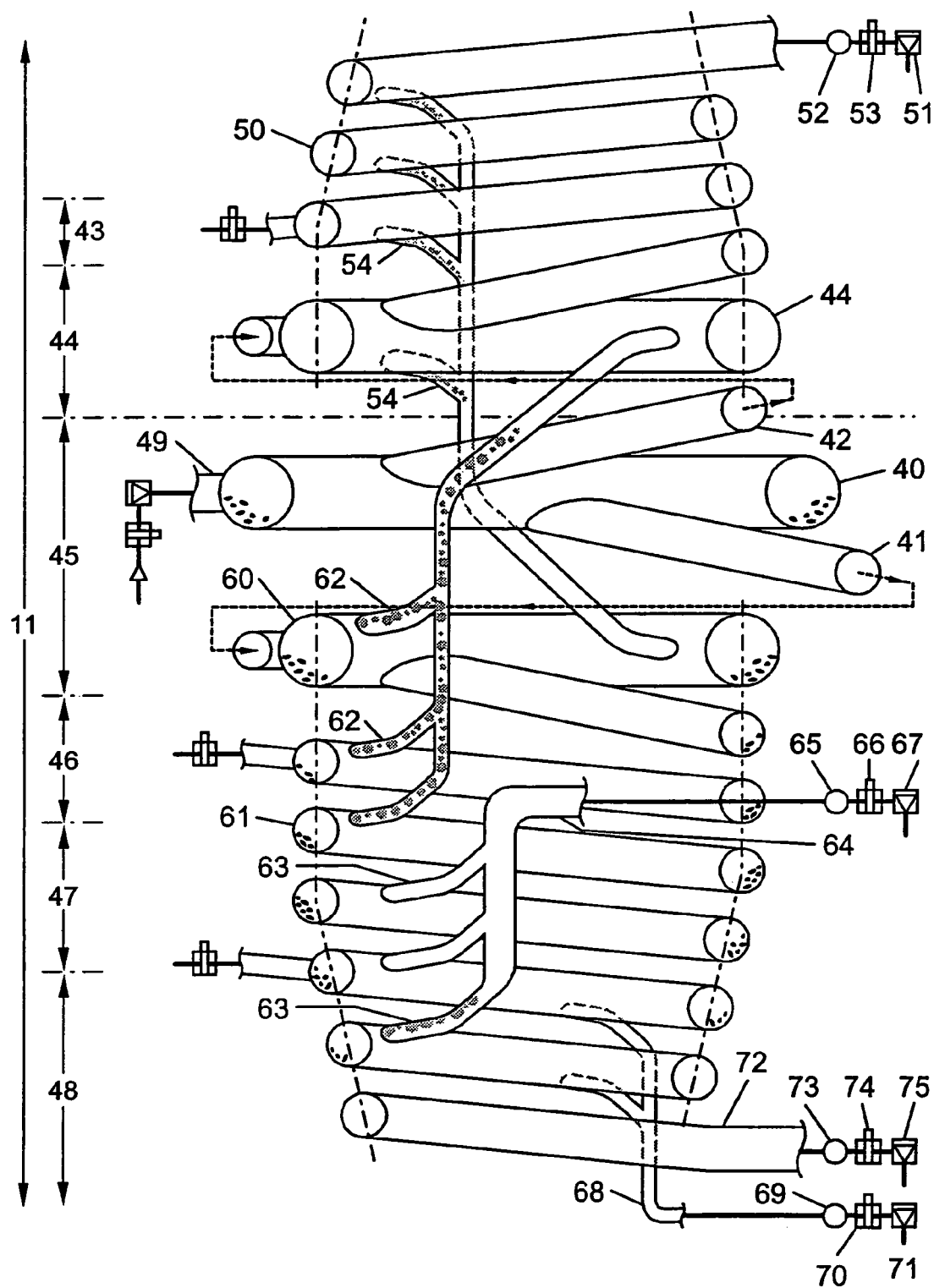
FIG. 2 shows a schematic toroidal separator suitable for use in the present invention.

FIG. 2 shows a toroidal separator 11 having a main bore 40 which is provided with exit lines 41 and 42 for heavier and lighter fluids respectively. The exit line 41 is tangential to the bottom circumference of the bore 40 and is mounted on the lower outer portion of the bore. The exit line 42 for lighter fluids is mounted tangentially to the upper inner portion of the bore 40. The location of the outlet is, of course, dependent on the actual flow which is expected to pass around the bore and therefore the location of the connections of the exit lines can be changed without effecting the operation of the invention.

The separator 11 is divided into a number of different interlinking areas, a gas stabilization section 43, a gas toroidal 44, a liquid toroidal section 45, a liquid stabilizing section 46, an oil separation section 47 and a solids removal section 48. The usual medium would comprise a combination of sand and other solids, gaseous or liquid hydrocarbons, and water. In this example, the multi-phase flow production enters the main bore 40 through inlet 49 and is separated into wet gas, that is mainly gas but with entrained liquid, which exits through exit line 42, and solids, liquid hydrocarbons such as oil, water and a little entrained gas which exit the bore 40 through exit line 41.

The wet gas travels upwardly through the gas spiral toroidal 44 and a spiral conduit 50, with the pressure/flow rate controlled by a choke 51 which is on the downstream side of gas sensors 52 and a gas isolation valve 53. The liquid within the wet gas is forced into the outer wall of the gas toroidal 44 and the conduit 50 and collects. At certain points in the outer wall of the toroidal 44 and conduit 50, liquid drain pipes 54 are provided to direct any liquid which has been separated from the gas flow back into a liquid toroidal 60. The multi-phase liquid having trapped gas, which exits through exit line 41, passes, via a liquid toroidal 60, into the liquid stabilization section 46, which is the upper portion of a spiral conduit 61. As the liquid spirals down the conduit, any entrained gas is separated to the inner upper portion of the conduit and is separated off via exit lines 62 and is directed into the gas toroidal 44. As the fluid passes further down through the conduit, and the gas is removed, it is the oil which moves to the upper inner portion and this is separated off via exit lines 63 into a common pathway 64, which subsequently passes, via oil sensors 65 and an oil isolation valve 66 through an oil choke 67.

At the lowermost end of the spiral conduit 61, the sand/solids slurry, containing some residual liquid and any sand or solids entrained in the flow, pass out of the spiral conduit via a solid slurry line 68, past a solids sensor 69, a solids isolation valve 70 and through a solids choke 71. The remaining water is channeled through a water exit line 72 past water sensors 73, a water isolation valve 74 and through the water choke 75.

FIG. 1 shows a vertical well production test configuration to a surface vessel being either a drilling vessel or a dedicated intervention well test vessel. This configuration can be installed using a intervention riser 16 capable of containing the maximum well operating pressure by using a drilling vessel or a well test/intervention vessel.

Each of the exit lines from the separator II for gas, oil, water and solids is connected to a respective pump 76, 77, 78, 79 for delivering the separated phases to the surface depending on the separator operating pressure. The choke line 80 can be connected to the gas pump 76 to deliver the separated gas to the surface. The outlets from the water 78 and solids 79 pumps are joined to deliver the water/solids, via the intervention riser line 81 to the surface. The separated oil is delivered via oil supply line 82 back into the bore 15, above the upper production barrier valve 25, for delivery to the surface.

If higher levels of separation are required, the separated phases can be admitted for further separation using a second or third separator. Alternatively, additional tubular bores can be provided as part of one or each exit line, thereby providing additional separation before the spiral conduits.

In a preferred example a booster line 83 on the intervention 16 is used to provide drive fluid to power the pumps, with exhaust drive fluid returning up the riser line 84, although the pumps could, alternatively, be powered electrically.

Figure 3:
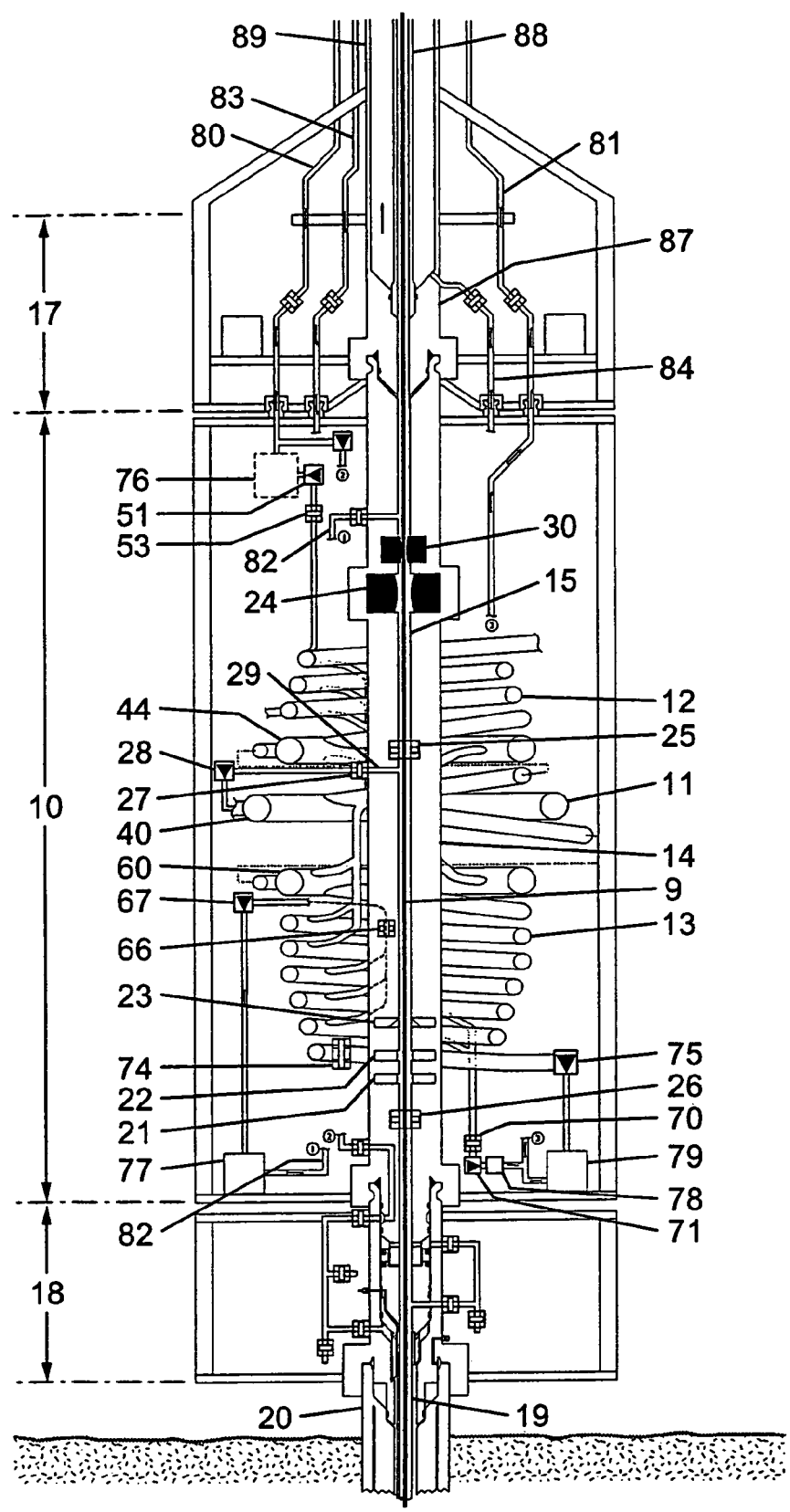
FIG. 3 is a schematic side view of the stacked configuration using a low pressure drilling riser and a maximum well operating pressure internal riser.

FIG. 3 shows a configuration that can be deployed by a drilling vessel using a heavy low pressure drilling riser 89 that does not require a dedicated intervention riser 16.

The riser which is attached to the emergency disconnection package 17 is a low pressure drilling riser 89 and, as such, the drive fluid can be exhausted back into the main drilling riser, rather than requiring a separate line, with the coil tubing, cable or wire line 9, as well as the separated oil, passing through a tubular pipe 88 within the riser.

The tubular pipe 88 can be drill pipe, tubing or casing of a suitable diameter and capable of containing above the maximum well bore pressure. The production test system can be run and connected up using the drilling riser 89. The drilling vessel can then run and lock the tubular pipe into the body of the emergency disconnect package connector 87 to achieve full well access.

Once the fluids are on the surface vessel, they are handled in the same manner as a surface flow test albeit at a reduced pressure.

The riser lines 80, 81, 83 and 84 are shown as part of the riser but could equally be flexible lines hung from the surface vessel and connected to the emergency disconnect package 17.

Figure 4:
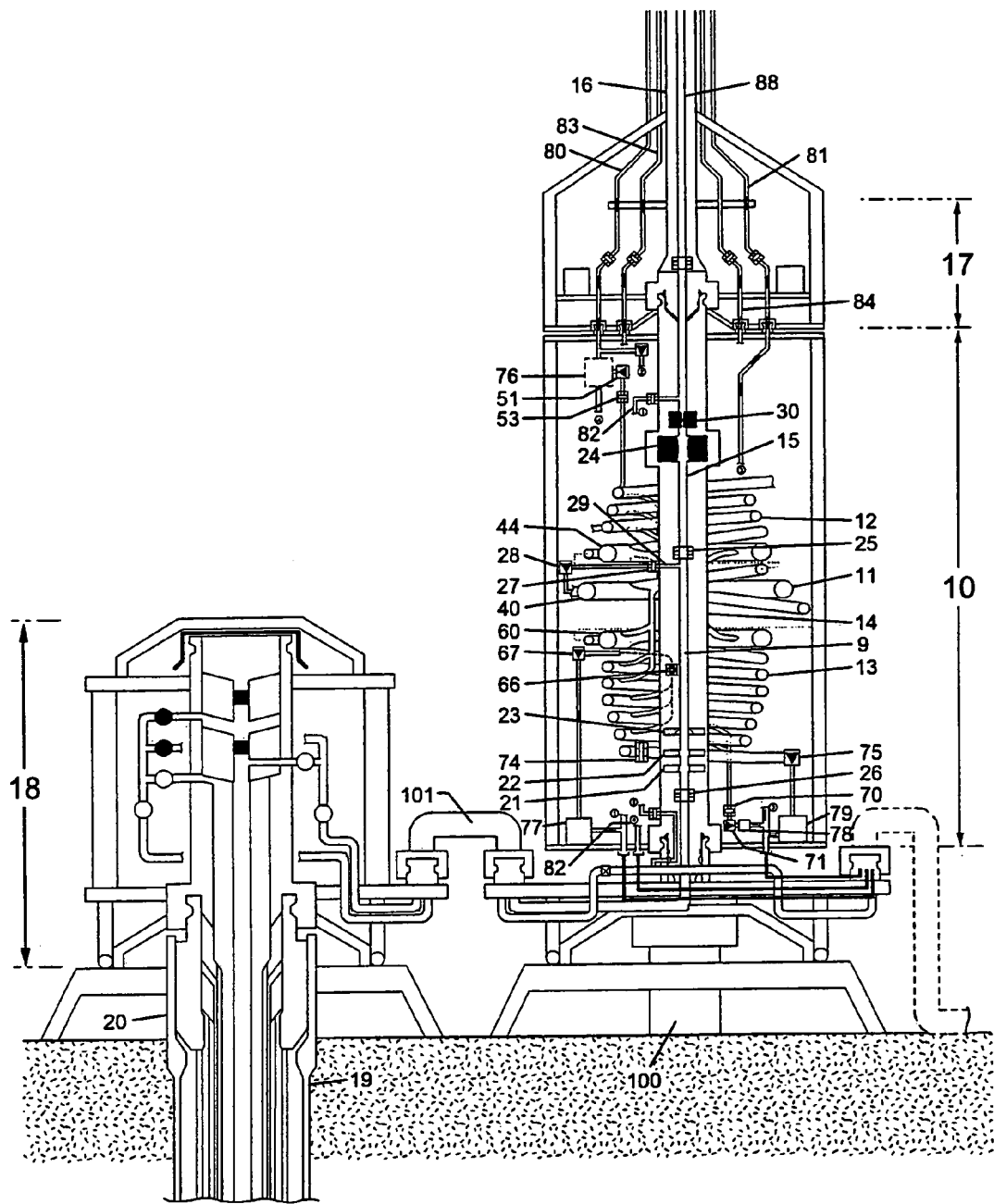
FIG. 4 shows the present invention in a side-by-side arrangement but flowing up a intervention riser.
Figure 5:
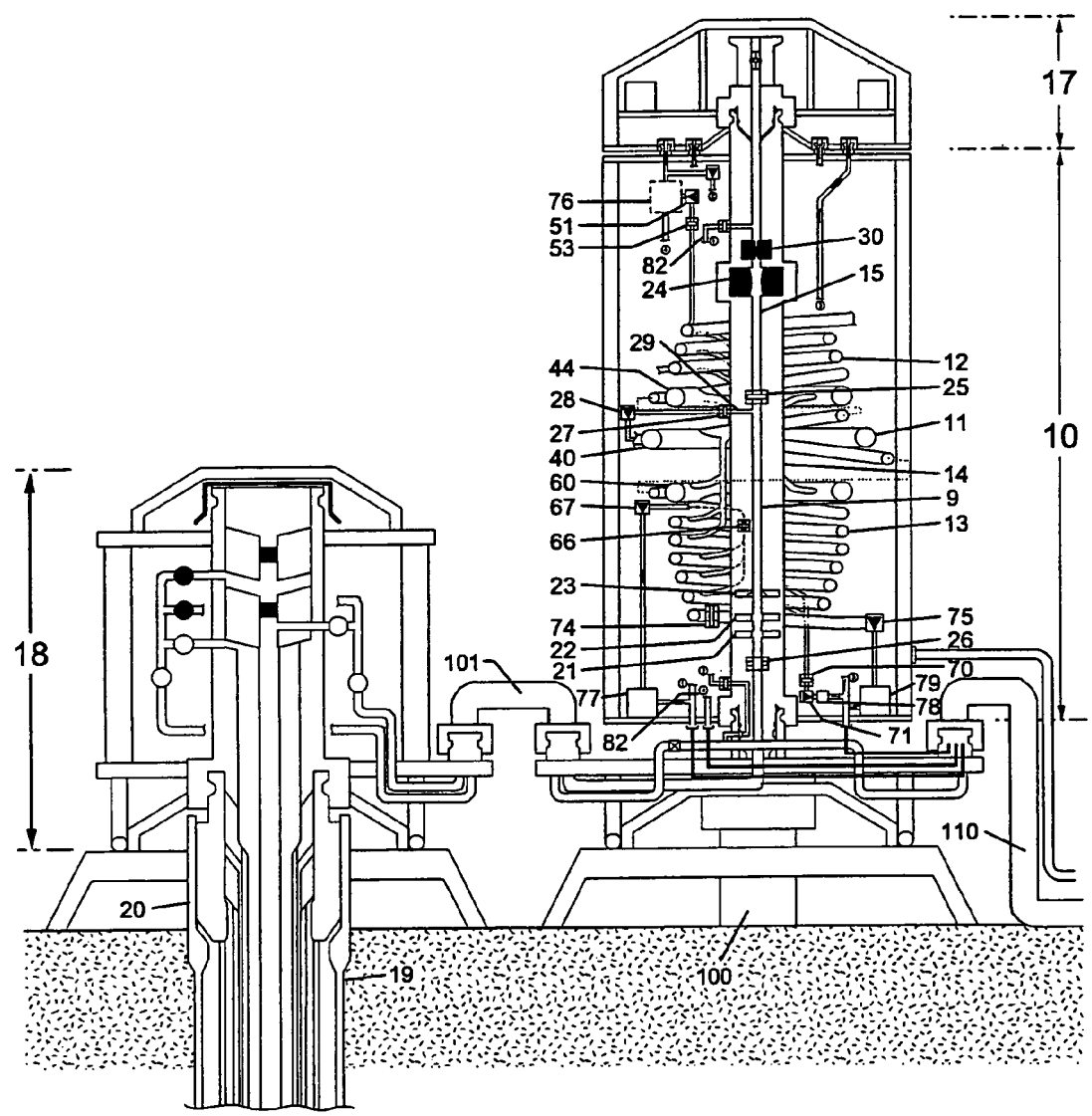
FIG. 5 shows a further example of a side-by-side arrangement flow into a pipeline bundle.

Using a field support vessel with lifting capability, the test module can be positioned adjacent the tree and connected up, either in the stacked configuration in FIGS. 2 and 3 or alternatively and as shown in FIGS. 4 and 5 in a side-by-side arrangement. The appropriate flow lines can connect the test module to the field manifold such that, once installed and flowing, the field support vessel can depart.

FIGS. 4 and 5 show side-by-side configurations, with the separator package 10, emergency disconnect 17 and riser 16 mounted on a firm base, such as a pile 100, within the sea bed and connected to a spool tree, in this case, a conventional spool tree 18 or any type of subsea production tree via a bridging line 101, through which all the necessary fluids can be caused to flow in individual lines. In this arrangement, there is, clearly, no direct vertical access to the well. The riser can be removed as it merely provides the means for getting the necessary fluids to the production test vessel and, subsequently, passing the separated phases from the multi-phase medium back to the surface. This can, of course, be done via additional pipe lines bundles 110 which connect into the main field, via a manifold (not shown). Such an arrangement is shown in FIG. 5. This configuration allows direct vertical well intervention to the spool tree 18 or other type of subsea production tree independent of the well processing operation.

The separator package 10 in FIG. 5 could also be used in the FIG. 1 configuration directly connected to the spool tree 18. This allows the system to flow to a subsea field system or using a flexible bundle instead of a rigid bundle 110 to the surface being either the drilling rig or intervent vessel or a separate production flow test vessel and allowing the surface vessel to depart. The main purpose of this is to flow test the system which is independent of the subsea tree.

Two examples of spool trees which can be utilized in the arrangement in FIG. 1, 2 or 3 are shown in FIGS. 6A and 6B. FIG. 6A represents an external cap flow test spool tree and FIG. 6B shows an internal cap flow test spool tree.

To prevent the requirements to remotely connect flow lines from the spool tree 18 to the separator 10, to achieve vertical flow, two variations of the spool tree are suggested. This will enable the spool tree to provide double mechanical isolation barriers to the well flow.

A spool tree 18 is connected and sealed to a well head 20 comprising of a connector 121 and a spool body 122. A orientated tubing hanger 123 is supported at a precise elevation in the spool body 122. A lateral production port 124 provides a path for the well fluid to flow to a production master valve 125, then through a production isolation valve 126, and into a pipeline (not shown).

In the main vertical bore of the tubing hanger 123, above the lateral port 124, are two independent closure members 130, 131. The tubing hanger is provided with its own mechanical locking system to the spool body 132 and above is a second mechanical lock system 133 providing a dual independent lockdown system.

Below the tubing hanger 123 from the annulus, between the tubing 19 and the spool body 122, a lateral port 140 connects to an annulus master valve 141, an annulus isolation valve 142 and to an annulus pipeline (not shown). A crossover line with a crossover valve 144 provides a fluid path between the annulus and production pipework. An annulus workover path with an annulus workover valve 145 communicates with the spool body bore 150 below the top of the spool body 122. A production port 151 communicates with the spool body bore 150 between the workover port 146 and the top of the tubing hanger 123.

FIG. 6a shows a external tree cap 160 with a external connector 161 connecting and sealing to the hub profile of the spool body 122. Monitoring and venting ports are provided to access the workover port 146 and the production port 151. The tree cap 160 provides a total seal to the spool body bore 150 and a internal cap seal 164 prevents fluid communication between workover port 146 and production port 151.

In FIG. 1, the separator 10 has a connector with a internal arrangement similar to the tree cap 160 that allows vertical independent production and annulus communication between the spool tree 18 and the separator 10.

FIG. 6b shows the use of a internal tree cap 170 that locks and seals to the internal bore of the spool body 122. The internal tree cap 170 has a production/annulus isolation seal between the production port 151 and the annulus port 146.

In this arrangement, the spool tree will provide double mechanical pressure isolation of the well bore with or without the tree caps 160, 170 in place and when the separator 10 is connected.

When direct well access is required, the closure members 130, 131 have to be opened or removed and the valve and ram barriers in the separator 10 will become the prime isolation barriers.

What is claimed is:

1. A method of flowing a subsea well, the method comprising the steps of:
    supplying a multi-phase medium from a subsea tree to a removable separator package;
    separating the multi-phase flow into one or more phases at desired pressures using a spiral toroidal separator having a plurality of outlets, the desired pressure being controlled by at least one pressure control device on each outlet of the spiral toroidal separator; and
    analysing each separated phase to determine the amount and quality of products produced by the well.

2. A method according to claim 1, wherein the analysis is carried out subsea.

3. A method according to claim 1, wherein the analysis is carried out at the surface.

4. A method according to claim 1, wherein the pressure of one or more of the constituent phases is reduced to surface or atmospheric pressure.

5. A method according to claim 1, wherein the pressure of one or more phases is reduced to a pressure below the hydrostatic pressure in the bore at the seabed.

6. A method according to claim 1, further comprising the step of pumping one or more of the constituent phases to the analysis location.

7. A system for use in flowing a sea well, the system comprising:
- a subsea tree for, in use, connection to a wellhead;
- a spiral toroidal separator package in fluid communication with a fluid take off from the subsea tree, such that, in use, a multi-phase medium can flow through the subsea tree into the separator package for separation into one or more phases;
- at least one outlet from the separator package for each separated phase;
- a pressure control device on each outlet from the separator package for allowing the system to be operated at different wellhead pressures; and
- at least one sensor on each outlet operable to determine the amount and quality of products produced by the well.

8. A system according to claim 7, wherein the separator package is substantially vertically aligned with the subsea tree.

9. A system according to claim 7, wherein the separator package is placed adjacent to the subsea tree.

10. A system according to claim 7, further comprising a pressure containing device for containing the pressure of the fluid from within the tree, whilst permitting wire line, cable or coil tubing access through the tree.

11. A system according to any claim 7, wherein the pressure control device is either a choke or a pump.

12. A system according to claim 7, further comprising valves and a ram isolation package to facilitate a reduction in the pressure in the well bore when required.

13. A system according to claim 7, further comprising an emergency disconnect package.

14. A system according to claim 7, wherein the one or more outlets from the separator package are connected to flow lines in pre-existing subsea infrastructure.

15. A system according to claim 7, wherein the one or more outlets from the separator package are connected to individual flow lines to the surface.

16. A system comprising:
- a spool body having a bore therethrough;
- a first pressure isolating barrier coupled to said spool body and operable to isolate pressure within the bore from pressure below said first pressure isolating barrier;
- an second pressure isolating barrier coupled to said spool body and operable to isolate pressure within the bore from pressure above said second pressure isolating barrier;
- a fluid take off in fluid communication with the bore between said first pressure isolating barrier and said second pressure isolating barrier;
- a spiral toroidal separator disposed circumferentially about said spool body and in fluid communication with said fluid take off
- a plurality of outlets disposed on said separator, wherein each of said plurality of outlets has a pressure count device coupled thereto; and
- at least one sensor on each said plurality of outlets, wherein said sensors are operable to determine the amount and quality of products produced by the well.

17. The system of claim 16, wherein said spool body is a full bore spool.

* * * * *